US012361824B2

(12) United States Patent
Viradia et al.

(10) Patent No.: US 12,361,824 B2
(45) Date of Patent: Jul. 15, 2025

(54) CONTROL OF STREET LIGHTS TO INDICATE PRIORITY ROUTES IN SMART CITIES

(71) Applicant: ITRON, INC., Liberty Lake, WA (US)

(72) Inventors: Rajeshkumar Vallabhbhai Viradia, Bangalore (IN); Prasad Deshpande, Bengaluru (IN); Ashwinkumar V. Kupsad, Karnataka (IN)

(73) Assignee: ITRON, INC., Liberty Lake, WA (US)

( * ) Notice: Subject to any disclaimer, the term of this patent is extended or adjusted under 35 U.S.C. 154(b) by 83 days.

(21) Appl. No.: 18/360,714

(22) Filed: Jul. 27, 2023

(65) Prior Publication Data

US 2025/0037578 A1 Jan. 30, 2025

(51) Int. Cl.
*G08G 1/07* (2006.01)
*G08G 1/00* (2006.01)
*G08G 1/087* (2006.01)

(52) U.S. Cl.
CPC ............... *G08G 1/087* (2013.01); *G08G 1/22* (2013.01)

(58) Field of Classification Search
CPC ........ G08G 1/087; G08G 1/22; G08G 1/0116; G08G 1/0129; G08G 1/0145; G08G 1/081; G08G 1/096783; G08G 1/096811; G08G 1/096838; G01C 21/3461; G01C 21/3492; G06Q 10/02; G06Q 10/047; G06Q 10/063; G06Q 30/0259; G06Q 30/0261; G06Q 30/0266; G06Q 30/0277; G06Q 50/26; G06Q 50/40; H04W 4/024
USPC ...... 340/906, 815.4, 815.65, 815.66, 815.73, 340/815.78
See application file for complete search history.

(56) References Cited

U.S. PATENT DOCUMENTS

2005/0209770 A1 9/2005 O'Neill et al.
2014/0070961 A1* 3/2014 Collar .................... G08G 1/096 340/905
2016/0286627 A1 9/2016 Chen et al.
2019/0385448 A1* 12/2019 Montemurro ........ G08G 1/0112
2020/0334979 A1* 10/2020 Gonçalves ........... G08G 1/0129
2021/0150907 A1* 5/2021 Nakano .................... G08G 1/22
2021/0375132 A1 12/2021 Kawasaki et al.
2022/0053625 A1 2/2022 Zhou et al.
(Continued)

FOREIGN PATENT DOCUMENTS

WO 2018/190703 A1 10/2018

OTHER PUBLICATIONS

International Search Report for Application No. PCT/US2024/39714 dated Oct. 16, 2024.

*Primary Examiner* — Anh V La
(74) *Attorney, Agent, or Firm* — Artegis Law Group, LLP

(57) ABSTRACT

Various embodiments relate to methods and systems of using street lights to indicate emergency or other priority routes along a route in a network of streets. In one example, a central controller receives a request to indicate a priority route, for use by one or more vehicles. The central controller queries a database of street lights to select a plurality of street lights that are located along the priority route. The central controller transmits, to respective controllers associated with the selected plurality of street lights, respective indications to operate the selected plurality of street lights in a priority route mode. Embodiments further include updating an operating mode of the selected street lights based on position updates for the one or more vehicles.

20 Claims, 6 Drawing Sheets

(56) References Cited

U.S. PATENT DOCUMENTS

| | | | | |
|---|---|---|---|---|
| 2022/0159815 | A1 | 5/2022 | Tanaka et al. | |
| 2022/0343761 | A1* | 10/2022 | Bandi | G08G 1/0145 |
| 2023/0306842 | A1* | 9/2023 | Smith | G08G 1/096783 |

* cited by examiner

CONTROL OF STREET LIGHTS TO INDICATE PRIORITY ROUTES IN SMART CITIES

BACKGROUND

Field of the Various Embodiments

The various embodiments relate generally to control of street lights, and more specifically to the control of street lights to indicate priority routes in smart cities.

Description of the Related Art

Emergency response personnel seek to arrive at an emergency site as soon as possible after receiving a notification of such emergency (such as a request for police, a fire incident, and so on). Certain standards establish goals for response times in emergency situations. For example, National Fire Protection Association (NFPA) Standard 1710 establishes a 60-second "turnout time" and a 240-second "travel time" to establish a 300 second (5-minute) first "EMS response time" benchmark time goal for not less than 90% of dispatched incidents.

One technology that is used to decrease response times is to permit emergency response personnel in emergency vehicles to have control of traffic signals, so that personnel responding to an emergency can change traffic signals as emergency vehicles approach the traffic signals to allow passage of the emergency vehicle without having to cross an intersection against the traffic light. Another technology that has been deployed is equipping traffic signals with a capability to detect sounds consistent with approaching and departing emergency vehicles, and change the traffic signal to permit passage of the emergency vehicle.

However, even with these existing technologies average response time for EMS vehicles is 7 minutes in cities and increases to 14 minutes in rural areas, which does not meet the NFPA 1710 standard. Therefore, further improvements in such response times would be desirable.

BRIEF DESCRIPTION OF THE DRAWINGS

So that the manner in which the features of the various embodiments can be understood in detail, a description of the inventive concepts may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
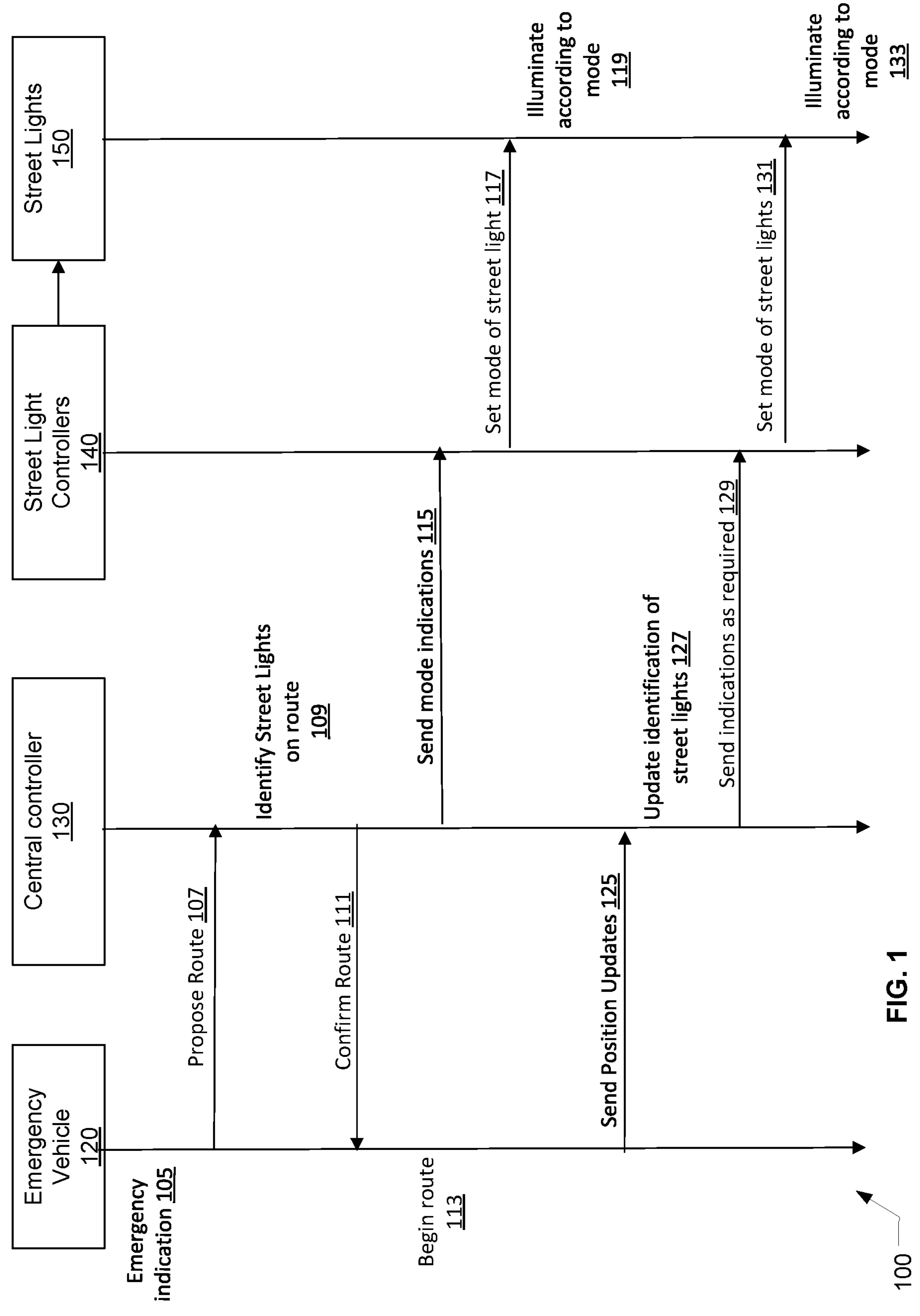
FIG. 1 illustrates an example flow diagram showing a process for identifying and controlling street lights along a priority route, according to various embodiments.

In urban environments, vehicles and other equipment responding to emergencies can have their progress impeded by other vehicles on the road. For example, non-emergency vehicles may be traveling in all available lanes of a road leading to a site of an emergency. A driver of a non-emergency vehicle may not perceive that emergency vehicles or other equipment are approaching or may need to use a lane occupied by the driver's vehicle. Emergency vehicles can signal an emergency by audible and visual cues, such as sirens and lights. Drivers of non-emergency vehicles are required by law to yield to emergency vehicles, and many drivers diligently attempt to comply. Audible cues can be effective in some situations, but for many drivers, detecting a location and/or a direction of a vehicle having an active siren can be difficult. This difficulty is increased in urban environments where sounds can be absorbed and reflected by various structures, foliage and other objects. Such absorption and reflection can vary depending on many factors, so that even an attentive driver may take some time to ascertain from where an emergency vehicle is coming and whether the driver should yield, and during that time, the driver may obstruct progress of the emergency vehicle or inhibit other drivers from yielding. Vehicle-mounted visual cues also can be effective in some situations, but their usefulness is limited to line of sight from the responding emergency vehicle to non-emergency vehicles. In urban environments with visual obstructions and many intersecting streets, vehicle-mounted visual cues may not provide adequate time for drivers of non-emergency vehicles to yield.

While mechanisms exist that allow emergency vehicles to change traffic lights to potentially reduce an amount of time it takes emergency vehicles to cross an intersection and to increase safety by reducing the chances of collisions with cross traffic, these mechanisms do not provide drivers of non-emergency vehicles with any information about an intended direction or path of an emergency vehicle. For example, an emergency vehicle could cause a signal to allow a left turn by the emergency vehicle, but a driver of a vehicle in front of the emergency vehicle that is not ultimately impeding the emergency vehicle could be startled and respond inappropriately. If the driver could have more knowledge of the direction the emergency vehicle would take, the driver may be less likely to have an overreaction or respond in a startled manner.

According to embodiments of the disclosure, street lights can be controlled by respective controllers that are in communication with a central controller. The central controller can receive a request for a priority route indication, such as a notification from an emergency vehicle of an intended route to respond to an emergency. The central controller responsively analyzes and confirms the intended route, selects street lights that can be put into a Priority Route Indication (PRI) mode, and send indications(s) for receipt by controllers of those street lights that indicate to the controllers that certain street lights are to be placed in the PRI mode. In some embodiments, an indication sent by the central controller to a street light controller is contained in a message, and such message also can contain other information. In some embodiments, the message is transported in one or more packets sent on a network.

While an emergency vehicle is traversing the route, the central controller can receive position information update(s) that describe a position of the emergency vehicle. The central controller, responsive to receiving these position information updates, determines whether there are street lights in PRI mode that can be deactivated, for example, because the emergency vehicle(s) have passed those street light(s). Additionally, based on these position information updates, the central controller can determine that the emergency vehicle has deviated from the expected emergency route (that is currently indicated by street lights in PRI mode), and responsive to that determination, identify street lights to be placed into PRI mode that are on a revised route and identify street lights to be returned to a normal operating mode. The central controller responsively sends indications to respective controllers for these street lights to effectuate the changes. The indications sent by the central controller can be in or associated with messages that contain other information and/or instructions for street light controllers to implement. For example, a message can contain information indicating a time at which to enter PRI mode and/or a duration to remain in PRI mode, and thus contains both an indication to enter PRI mode, and other information.

Additionally, while the disclosed techniques are described primarily below using situations involving emergency response vehicles, the disclosed techniques can be applied to many other situations, including for example, transport of sensitive or dangerous materials, parades, transport of sensitive personnel, convoys of vehicles, and so on, as described below in more detail. Additional embodiments provide for different PRI modes. For example, one mode can cause street lights to visually indicate a police or fire emergency, and another mode can cause street lights to visually indicate a parade.

At least one technical advantage of the disclosed techniques is that, with the disclosed techniques, street lights can be used as indications that an emergency or other priority vehicle will be traveling on a route along which the street lights are located. In normal operation, the street lights function to illuminate their surroundings (e.g., portions of sidewalks and streets). The street lights can enter a mode that is distinct from simple illumination and that is defined as or generally understood to provide a priority route indication. Drivers of non-priority vehicles can use the street lights to understand whether their vehicles are on a path that is needed by an emergency or priority vehicle and take appropriate action. This approach to signaling drivers of a priority route improves the reliability and specificity of the priority route information being conveyed to the drivers relative to the present approach of audible and visual cues mounted on emergency response vehicles.

In the following description, numerous specific details are set forth to provide a more thorough understanding of the various embodiments. However, it will be apparent to one skilled in the art from this disclosure that the inventive concepts may be practiced without one or more of these specific details and additional implementation details can be added.

FIG. 1 illustrates an example flow diagram showing a process 100 for identifying and controlling street lights along a priority route, according to various embodiments. Although the interactions between the devices in process 100 are shown in an order, persons skilled in the art will understand that the interactions can be performed in a different order, interactions can be repeated or skipped, and/or can be performed by components other than those described in FIG. 1. As shown in FIG. 1, process 100 involves various operations performed by, without limitation, an emergency vehicle 120, a central controller 130, street light controllers 140, and street lights 150. Emergency vehicle 120, central controller 130, and street light controllers 140 are communicatively coupled via one or more networks (not shown). Emergency vehicle 120 can both send messages to and receive messages from central controller 130. Similarly, central controller 130 can communicate indications to street light controllers 140 and in some embodiments also can receive information from street light controllers 140. Any technically feasible mechanism can be used to implement the one or more networks used for communication between and/or among emergency vehicle 120, central controller 130, and street light controllers 140, such as one or more wired or wireless networks, one or more local area networks, one or more wide area networks, one or more cellular networks, combinations thereof, and/or the like.

As shown, process 100 begins at step 105, where emergency vehicle 120 begins responding to an emergency indication, such as a dispatch call regarding a fire, a medical emergency, and/or the like. At step 107, emergency vehicle 120 proposes a route, that the emergency vehicle plans to take for responding to the indicated emergency, to central controller 130 in one or more messages. Additionally or alternatively, emergency vehicle 120 provides a current location of emergency vehicle 120 and a destination associated with the emergency indication. According to such embodiments, central controller 130 can determine and propose a route to emergency vehicle 120 as described in further detail below with respect to FIG. 2.

At step 109, central controller 130 identifies a subset of street lights from among street lights 150 along the proposed route. Central controller 130 can access a database that contains location information for street lights 150 during such identifying. Central controller 130 also can analyze the proposed route, such as by analyzing current traffic on the route, and comparing the proposed route with alternative routes to a destination. Central controller 130 can access traffic databases, routing databases, and/or services that provide traffic and routing information, to obtain information for use in such analysis. In some embodiments, individual street lights 150 are a source of such information and can detect, for example, traffic, pedestrians, and other objects in the street near the individual street lights 150.

At step 111, central controller 130 sends a message to emergency vehicle 120 to confirm the route. The confirmation serves as an acknowledgement of the proposed route provided by emergency vehicle 120 during step 107 and can also indicate details concerning how priority will be indicated by the subset of street lights along the route. If emergency vehicle 120 had indicated a current location and a site of the emergency at step 107, central controller 130 also provides a suggested route at step 111. In some embodiments, at step 111, central controller 130 confirms a route proposed at step 107, and provide one or more alternative routes.

At step 113, emergency vehicle 120 begins to traverse the proposed route. In some embodiments, emergency vehicle 120 begins to traverse the route without waiting for a route confirmation at step 111.

At step 115, central controller 130 sends mode indications using one or more messages to the street light controllers 140 from among street light controllers 140 that control the subset of street lights 150 identified at step 109. The mode indications provide instructions for the street light controllers 140 to control the subset of street lights 150 to activate (start) a PRI mode. In some embodiments where the street lights 150 are capable of indicating multiple PRI modes, the mode indications sent by central controller 130 further specify which of the PRI modes is to be activated.

At step 117, each of the street light controllers 140 receiving a mode indication for a street light 150 controlled thereby activates the PRI mode for that street light 150. For example, a street light controller 140 can send one or more messages and/or provide one or more control signals to a street light 150 to indicate the PRI mode for that street light 150. In some embodiments, the one or more messages and/or one or more signals varies depending upon a type of street light 150 being controlled. Some embodiments provide that a given street light controller 140 can control a plurality of street lights 150, and the mode indications sent during step 117 can cause all of such plurality of street lights 150 to indicate PRI mode as a group, or the mode indications can selectively specify which of the plurality of street lights 150 are to activate PRI mode.

At step 119, the subset of street lights 150, for which PRI mode was set by the respective street light controllers 140, illuminate in accordance with the corresponding PRI mode. A PRI mode causes a visual change in illumination from street lights 150, such as causing street lights 150 to flash, change color, change intensity, activating flashing colored lights (e.g., red and blue) that are evocative of visual indicators used by emergency vehicles, and/or other visually differentiating characteristics. In some embodiments, a PRI mode also causes street lights 150 to give audible indication (s) (e.g., the sound of a siren, speech asking drivers to pull over).

At step 125, emergency vehicle 120 sends a position update to central controller 130. The position update can include Global Positioning System (GPS) coordinates of emergency vehicle 120 or some other information that indicates a position of emergency vehicle 120. The position updates also can include other information, such as speed information, direction of travel, and/or the like.

At step 127, central controller 130 updates identifications of the subset of street lights 150 that are to be operating in PRI mode. Step 127 includes comparing the position of emergency vehicle 120 on the route with locations of the subset of street lights 150 that are indicating PRI mode to determine which of these street lights 150 have been passed by emergency vehicle 120 and should no longer operate in PRI mode. In some embodiments, the updating at step 127 determines whether emergency vehicle 120 has deviated from the priority route, and responsively identifies additional street lights 150 that are along a new route that the emergency vehicle 120 is taking to identify an additional subset of street lights 150 for which PRI mode is to be activated.

At step 129, central controller 130 sends indications to those street light controllers 140 for street lights 150 that are to deactivate (stop) PRI mode or street lights 150 for which PRI mode is to be activated. Deactivating PRI mode stops street lights 150 from operating in a PRI mode. The indications are sent to the street light controllers 140 using the same techniques as step 115. The indications sent at step 129 are processed at step 131 by respective street light controllers 140, and thereby cause appropriate street lights 150, at step 133, to take some action with respect to PRI mode, such as to activate, deactivate or change PRI mode. Some embodiments provide a different street light controller 140 for each street light 150, other embodiments provide one street light controller 140 for multiple street lights 150, and still further embodiments provide a mixture of the foregoing approaches. For each embodiment, central controller 130 sends the indications at least to those street light controllers 140 that control the street lights 150 that are to take some action with respect to PRI mode.

Although not shown, steps 125-133 are continually repeated as emergency vehicle 120 traverses the route to the destination associated with the emergency. Thus, as emergency vehicle 120 continues to travel, street lights 150 are constantly being updated to reflect the location of emergency vehicle 120 and the progress of emergency vehicle 120 along the priority route.

Figure 2:
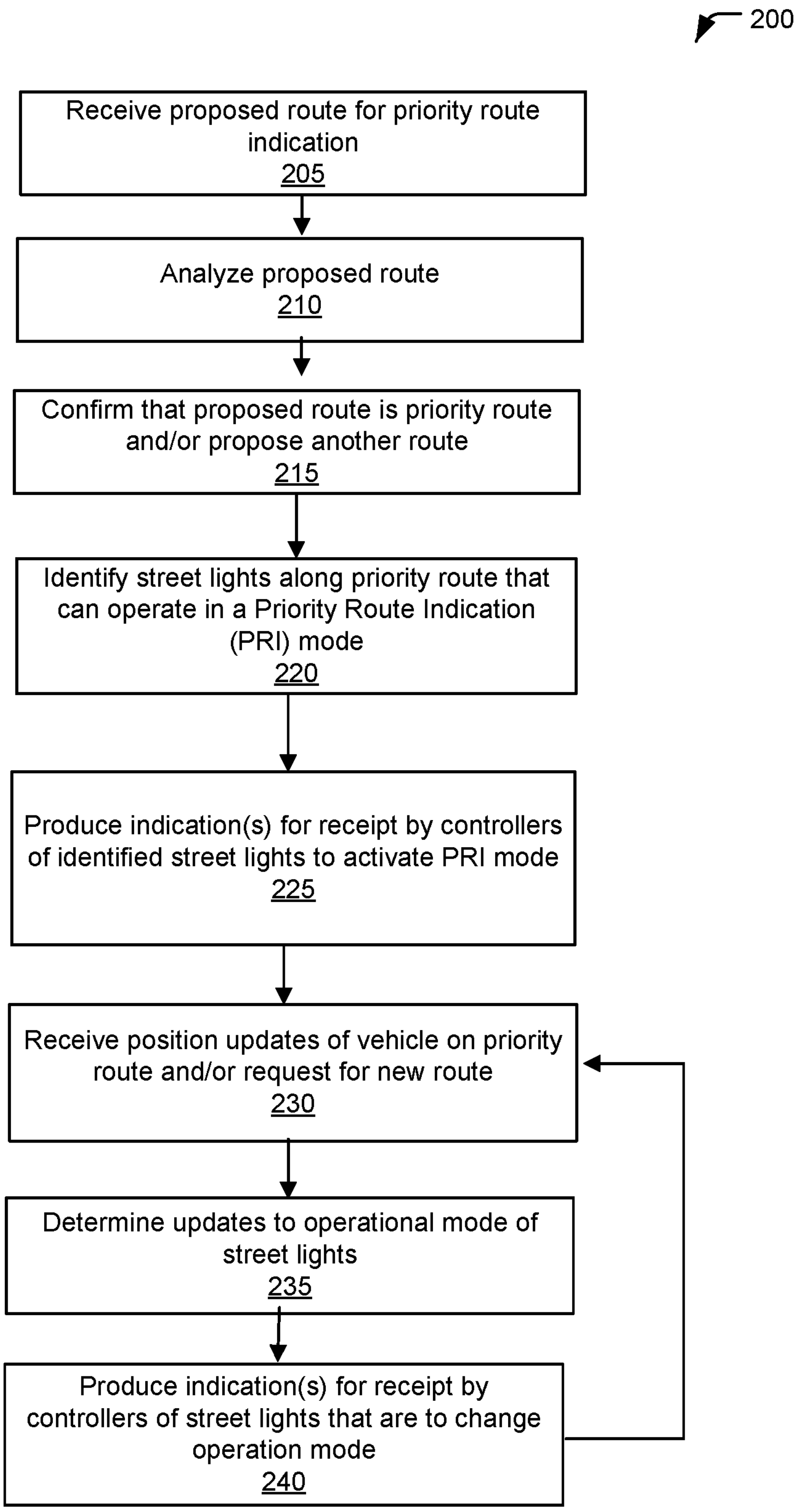
FIG. 2 is a flow chart of method steps for identifying and controlling street lights along a priority route, according to various embodiments.

FIG. 2 is a flow chart of method steps for identifying and controlling street lights along a priority route, according to various embodiments. Although the method steps are described as being performed by central controller 130, other computing devices in one or more other systems, such as a distributed computing system can perform the method steps. In some embodiments, central controller 130 is implemented as a distributed system. Furthermore, although the method steps are shown in an order, persons skilled in the art will understand that some method steps can be performed in a different order, repeated, and/or performed by components other than those described in FIG. 2.

As shown, a method 200 begins at step 205, where central controller 130 receives a proposed route, which can be the proposed route sent by emergency vehicle 120 at step 107 as described with respect to FIG. 1. The proposed route contains information sufficient for the central controller 130 to understand a start point, an end point, and a path therebetween to be traveled by a priority vehicle (e.g., emergency vehicle 120). In some embodiments, rather than originating from a priority vehicle, the request can originate from an emergency dispatch center or other source of priority route requests. In some embodiments, the request can be received from multiple sources; for example, a location of an emergency can be sent to the central controller 130 by an emergency dispatch center, and then a responding emergency vehicle 120 can separately send a message providing a current location of emergency vehicle 120 and a proposed route. In some embodiments, the request can direct central controller 130 to access required information from another location (e.g., by providing a Uniform Resource Indicator (URI) based on which the required information can be retrieved.) As would be understood from these disclosed embodiments, data required for central controller 130 to understand the proposed route can take a variety of forms and can be communicated to central controller 130 by any technically feasible mechanism.

At step 210, central controller 130 analyzes the proposed route. This analysis determines whether the proposed route is valid. The analysis can also include accessing information about traffic and other information to determine whether the proposed route is advisable and/or reasonable and/or optimal. As such, the route analysis of step 210 by central controller 130 varies in complexity across embodiments. In some embodiments, analysis at step 210 is only inputting the proposed route so that the proposed route is used by central controller 130, and central controller 130 performs little or no validation of the proposed route or evaluation of relative merits of the proposed route compared with one or more other possible routes. In other embodiments, such analysis assesses the proposed route on a number of factors, including validity checks based on current road closures (e.g., due to construction, weather, or incidents), current or predicted traffic congestion, as well as factors that increase a risk level of the route (e.g., whether the proposed route goes through areas with many pedestrians, passes by schools, or has many traffic signals, crosses train tracks or other obstacles). For example, a proposed route can be rated relatively low if the proposed route goes by an elementary school at a start or end time for the school, compared with alternate routes that have a longer duration. Such priority route assessment factors can be relative to potential alternative routes, and different relative priorities for route assessment can be established, such as based on circumstances or requirements within a particular community.

Additionally, prior recorded times for traversing all or a portion of the proposed route by priority vehicles can be used by central controller 130 to assess the proposed route at step 210. In some embodiments, the analysis considers a mean time, or both a mean time and a distribution of times for traveling the route. For example, while the route can be fast sometimes, the route can be very slow at other times. Day and time specific performance metrics can be used, where such data is available. Over time, data can be collected about how different routes and parts of routes perform, such that better analysis and route recommendations can be made. Other route evaluation factors can be considered, and the above are merely exemplary.

At step 215, central controller 130 confirms the proposed route and/or proposes another route to a source that proposed (or requested) the route (such as emergency vehicle 120 as discussed with respect to FIG. 1). In some embodiments can confirm the route to emergency vehicle 120 and a source that proposed or requested the route, if the source and the emergency vehicle 120 are different. If the central controller 130 considers that the route is not valid then the central controller 130 can send a return message raising this concern and proposing another route. If the central controller 130 finds that the route is not as good as another route, the central controller 130 can confirm the route and also provide an alternative route with information describing why the alternate route was judged preferable to the original route. If an alternative route was proposed, a responsive message can be received from the priority vehicle, indicating acceptance of this alternative route (or rejecting the proposed route, which would indicate that the original route or another route is preferred).

In some alternative embodiments, instead of receiving a proposed route that specifies a route from an origin to a destination for a priority vehicle at step 205, the central controller 130 receives a request from a priority vehicle for a proposed route, that would convey, by any technically feasible mechanism, an origin and a destination, rather than the proposed route itself. In such embodiments, the central controller 130 determines a proposed route according to the analysis performed during step 210 and proposes the route to the priority vehicle at step 215. In different implementations, a priority route to be indicated is determined according to any one or more of the foregoing examples, various subsets of these examples, or other technically feasible alternatives that result in specifying a route for a priority vehicle.

In some embodiments, central controller 130 also receives other information about the priority route from the priority vehicle or from another source, such as an emergency dispatch center. Such information can include a reason for the priority route (e.g., an emergency versus a parade versus moving sensitive materials), and information about a time at which to activate the priority route and a duration therefore. In some situations, a single vehicle is associated with a priority route, and in other situations a plurality of vehicles are associated with a priority route. For example, a leading vehicle and a trailing vehicle with zero or more vehicles in between can be associated with the priority route. This additional information is used in some embodiments as described in further detail below.

At step 220, central controller 130 identifies a subset of street lights 150 from street lights 150 that are along the priority route and that can visually indicate the priority route. Central controller 130 can access one or more databases to query which street lights 150 are along the priority route to identify the subset of street lights 150. Different embodiments have databases with different location information for street lights 150. For example, some databases can specify respective latitude/longitude coordinates for each of street lights 150, and a query would involve identifying street lights that are closest to a series of coordinates describing the priority route. A distance comparison metric can vary depending on street light locations. For example, a street that crosses a priority route can have a street light relatively close to the priority route, but that street light should not be identified to enter PRI mode, because that street light is not on the priority route. In those situations, a more precise comparison can be used than for street lights 150 along a road that is part of the route. In other embodiments, a database includes metadata about each of the street lights 150, such as a name of a street that each street light 150 illuminates, and that metadata is used to identify street lights 150 along the priority route.

In some embodiments, not all street lights 150 on a priority route that can operate in a PRI mode or modes are placed into PRI mode in every situation, or setup to operate the same. For example, an indication of a priority route can include patterns among groupings of street lights 150 on the route. In some examples, such as at night, some street lights 150 that are capable of operating in a PRI mode can be kept in a normal illumination mode while others on a priority route are placed in a PRI mode by their respective street light controllers 140. Different types or kinds of street lights 150 can have different operating capabilities, and different regions of a country or different countries can establish different conventions as to how to visually indicate a PRI mode, or how different types of PRI modes are visually indicated.

In some embodiments, if not all street lights 150 within an area can operate to visually indicate a priority route, the identification actions at step 220 are performed in connection with the analysis step 210 of the proposed route. If one possible route can visually indicate a priority route, while another cannot, then central controller 130 can propose the route for which street lights 150 are capable of indicating the priority route, depending on other relevant factors, as described herein.

At step 225, central controller 130 produces indications(s) for receipt by controllers of the identified subset of street lights 150, that are interpreted by the street light controllers 140 to activate a PRI mode at the identified subset of street lights 150. In some embodiments, a single street light controller 140 directly couples with a single street light 150, and that street light controller 140 can be uniquely addressed with an indication by central controller 130. In some embodiments, a single controller can control a plurality of street lights 150, and a given indication from central controller 130 can indicate to activate a PRI mode for all or any portion of that plurality of street lights. Each street light 150 can have a unique identifier (can be unique within that system, multiple systems, or more broadly). Some embodiments use relative identification of street lights 150. The indications from central controller 130 can be propagated via messages in a mesh network or cellular network to appropriate street light controllers 140.

The indication(s) from central controller 130 can specify a particular PRI mode to activate, if the controller and/or street light(s) support multiple PRI modes. The message(s) also can specify a time at which to activate PRI mode. The activation time can be an absolute time or relative to another value, such as a message time stamp. Such timing information can be based on information provided to central controller 130 when the priority route was requested, such as that a plurality of vehicles are to use the priority route. The message can specify a duration for the PRI mode. In some implementations, the central controller 130 will provide an indication, such as via a further message, when the PRI mode should be deactivated or changed. As described, changes to PRI mode can include using different visual or audiovisual indications depending on how far away or how much time will elapse until arrival of the emergency vehicle traveling on the priority route, for example. Different embodiments provide that street lights 150 visually (or audially and visually) indicate the priority route according to any of a variety of approaches. For example, street lights 150 can indicate the priority route by changing color, blinking according to a pattern, illuminating more brightly, or any combination of these examples, output a particular sound effect, or any other technically feasible approach to visually differentiate a street light 150 operating in a priority route mode from one that is not. In some embodiments, the visual appearance of PRI mode changes based on time of day. For example, for a daylight PRI mode, a strobing effect can be useful to draw attention to the street lights; however, at night, a strobing effect can be distracting to drivers, so that only a color change is used. In some embodiments, different visual indications are used to indicate different PRI modes. For example, red blinking can indicate an emergency PRI mode, while green blinking can indicate a parade. In other embodiments, a visual indication of a PRI mode changes. For example, a static red light can indicate an emergency PRI mode for a priority route, and when an emergency response vehicle is approaching a particular portion of that priority route, the street lights near that portion of the route can begin blinking, and stop blinking after the emergency response vehicle departs that portion of the priority route. To the extent that street lights 150 support options for indicating a priority route, the indications provided by central controller 130 to street light controllers 140 specify those options.

At step 235, central controller 130 receives position updates for the priority vehicle. These position updates can be received from the priority vehicle itself, such as via a network connection between the priority vehicle and an interface at central controller 130. In other embodiments, the position updates can come from an emergency dispatch center. At step 235, as central controller 130 determines that certain street lights operating in PRI mode have been passed, central controller 130 produces indication(s), for the respective street light controller(s) 140 of those street lights 150, that indicate PRI mode is to be deactivated. The timing of deactivation can be specified by the indication or the indication can be sent at a scheduled time in order to deactivate at an appropriate time. If multiple priority vehicles are traversing the priority route, central controller 130 tracks locations of all or some portion of those priority vehicles. Some embodiments track locations of at least of a leading vehicle and a trailing vehicle that have zero or more vehicles between the leading and trailing vehicles. The leading and trailing vehicles can be identified to central controller 130 in connection with a request for a priority route. At step 235, central controller 130 determines that certain street lights 150 operating in PRI mode have been passed after a last priority vehicle of the tracked vehicles has passed those street lights.

Additionally and/or alternatively, during step 230, central controller 130 can receive a request for a new route. In such circumstances, central controller 130 would use a current position of the priority vehicle and the destination from the existing priority route to perform any of the aspects of the analysis of step 210 to propose a new route for the priority vehicle. In some embodiments, a new route request specifies a new destination, and central controller 130 uses a current position of the priority vehicle and the new destination to step 210 to propose a priority route for the priority vehicle to the new destination. Central controller 130 also identifies street lights 150 along the newly proposed priority route (to the same or a different destination), as disclosed at step 210. The central controller 130 can wait for a confirmation of the newly proposed priority route from the priority vehicle before changing the priority route and dispatching indications to adjust which street lights 150 are to activate or deactivate a PRI mode accordingly. Deactivating PRI mode stops street lights 150 from operating in PRI mode. In some embodiments, central controller 130 causes activation of PRI mode for street lights on the newly proposed priority route, while maintaining PRI mode operation for street lights on the old priority route, at least until a further position update confirms that the vehicle(s) have taken the new route. The position updates can also indicate that the priority vehicle has deviated from the indicated priority route, and such deviation causes central controller 130 to treat this deviation the same as a request for a new priority route and proceed as described above. In situations where multiple priority vehicles are traversing the indicated priority route, a subset of those priority vehicles can deviate from the indicated priority route while others remain on the indicated priority route. In that circumstance, central controller 130 treats the deviation substantially as a request for a new route for those deviating priority vehicles, but also maintain the original priority route for the remaining priority vehicles. All of these actions and variations taken in response to the priority vehicle(s) requesting a new route or deviating from an established route are represented by step 230, which can incorporate aspects of steps 210 and 215 as described above, for determining updates to operational modes of street lights 150.

In some embodiments, central controller 130 receives a notification to cancel a priority route currently being indicated by one or more street lights 150, and central controller 130 responsively identifies any of the street lights 150 operating in PRI mode to indicate that priority route. Some embodiments determine whether any street light 150 operating in PRI mode for a cancelled priority route is also on a different active priority route (such as for a different emergency), and if so, then central controller would allow any such street light 150 to continue operating in PRI mode. The street lights 150 identified as being along a cancelled priority route and not also on an active priority route will then receive an indication to deactivate PRI mode according to step 240. Where multiple vehicles are traveling on a priority route, such as a convoy of vehicles, or multiple emergency response vehicles 120, some of those vehicles may leave (i.e., "cancel", for themselves, the priority route) while others continue to the destination. In such a case, central controller 130 can receive a notification that specifies which vehicles are leaving the priority route or an updated notification of which vehicles are traveling the priority route.

Central controller 130 then tracks only the position updates for the vehicles remaining on the priority route during step 230.

At step 240, central controller 130 produces indication(s) for receipt by respective controllers for street lights 150 that are to have an update to their operation mode (such as entering or exiting PRI mode). Central controller 130 can receive further position updates at step 230, and responsively repeat steps 235 and 240.

The above embodiments provide various examples of information (such as the disclosed indications) that can be sent by central controller 130 to street light controllers 140. It is understood that a variety of different machine representations can be used to convey the information described. For example, street lights 150 could have three modes (day, night, and PRI), and a PRI mode indication sent by central controller 130 can be two binary digits that completely specifies an operating mode, or a PRI mode indication can be a binary digit that indicates to activate or deactivate a PRI mode, and otherwise street light controllers 140 operate according to a normal schedule. Such information also can include street light identifiers where a street light controller 140 controls multiple street lights 150, times to enter and exit PRI mode, a type of PRI mode, and so on. This information can be contained within a message that can include other information for other street light controllers 140, as well as routing and network addressing information.

Figure 3:
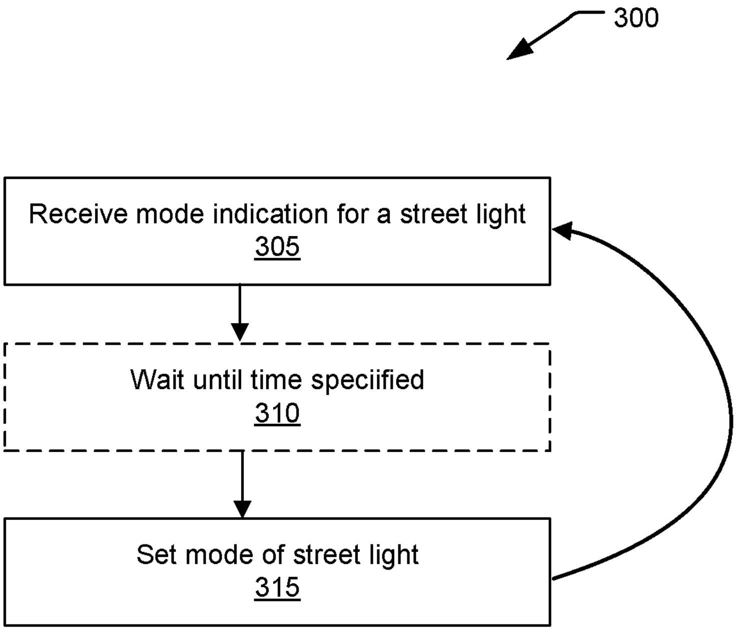
FIG. 3 is a flow chart of method steps performed by a street light controller for controlling street lights, according to various embodiments.

FIG. 3 is a flow chart of method steps performed by a street light controller for controlling street lights 150, according to various embodiments. Although the method steps are described as being performed by street light controller 140, other devices in one or more other systems can perform the method steps. In some embodiments, street light controller 140 is implemented as a distributed system; for example, a portion of a street light controller 140 can be integrated with each street light 150 controlled by that street light controller 140 and another portion can communicate with each of those portions. Furthermore, although the method steps are shown in an order, persons skilled in the art will understand that some method steps can be performed in a different order, repeated, and/or performed by components other than those described in FIG. 3.

At step 305, one or more of the street light controllers 140 receives an indication that is sent in a message to activate (start), deactivate (stop), or update a PRI mode for street lights 150. In some embodiments, the indication is received from central controller 130, such as one of the indications produced during steps 225 and/or 240. In some embodiments, an indication identifies one or more street lights 150 by one or more identifiers and also specifies an operational mode for each identified street light 150 from a set of operating modes. Such embodiments can be used where multiple street lights 150 can be controlled differently by a single street light controller 140 and/or where street lights 150 support multiple PRI modes. In some embodiments, an indication specifies the operational mode, but does not identify individual street lights 150. Such embodiments can be used where a single street light controller 140 controls a single street light 150, and where multiple street lights 150 are controlled as a group by a single street light controller 140. In some embodiments, an indication specifies one or more street lights 150, but does not specify an operating mode. Such embodiments can be used where multiple street lights 150 can be differently controlled by a single street light controller 140, and have one PRI mode. In some embodiments, an indication specifies neither individual street lights 150 nor an operating mode. Such embodiments can be used to reset all street lights 150 controlled by a street light controller 140 to a default or normal operation mode. Some embodiments include usage of any combination of the foregoing embodiments. In embodiments that identify street lights 150, each street light 150 can have a unique identifier, can be identified relative to other street lights 150, or can be identified in a range of street lights 150.

The message with the indication can be received through a network interface to a wired or wireless network. The network can be organized as a mesh network in which street light controllers 140 operate both to control respective street lights 150 and also to forward messages to other street light controllers 140.

In some embodiments, the message also includes information about when to implement an action associated with the indication (e.g., to activate, deactivate or update a PRI mode), and if so, street light controller 140 waits at optional step 310 until the time specified before proceeding to step 315. The time of activation, deactivation or updating can be an absolute time or relative to another value, such as a message time stamp. Such timing information can be based on information provided to central controller 130 in connection with a request for the priority route. The indication also can specify a duration for the PRI mode. As described, changes to PRI mode can include using different visual indications depending on how far away or how much time will elapse until arrival of the emergency vehicle traveling on the priority route, for example.

At step 315, street light controller 140 sets the mode of a street light 150 according to the mode indication received during step 305. Street light controllers 140 activate (start), deactivate (stop) and adjust PRI mode according to how street lights 150 are implemented and how street light controllers 140 connect thereto. In some embodiments, street light controllers 140 control street lights 150 using a communication protocol carried over one or more of a wireless interface and a wired interface. In some embodiments street light controllers 140 control street lights 150 using I/O lines that use voltage mode or current mode signaling, and/or can operate according to serial interface standards, such as RS-422, RS-485, USB, or another communication interface. In some embodiments, street light controllers 140 directly control how power is applied to various elements of street lights 150 (such as activating a red LED driver circuit versus a green LED driver circuit, or a combination driver circuits that collectively cause white light illumination). For example, a Light Emitting Diode (LED) street light can have a different control interface than a sodium vapor lamp. It would be appreciated that any technically feasible mechanism can be used to provide control of street lights 150 by street light controllers 140.

In embodiments in which multiple PRI modes are capable of being displayed by street lights 150, the message that contained the indication also specifies the PRI mode to activate; or alternatively, a default PRI mode is activated if a specific PRI mode is not specified. A change to an operating mode of street lights 150, such as switching into a PRI mode, switching out of a PRI mode, and switching from one PRI mode to another mode, can be accomplished by deactivating a currently active mode and then activating the other mode, or by overwriting a value that determines a current operating mode with a different value. Examples of adjustments to PRI mode were described with respect to FIG. 2, such as changing a blink rate based on proximity of the priority vehicle. Street light controllers 140 can maintain configuration information that is used to determine how a PRI mode is to be adjusted based on a received indication.

After setting the mode of the street light 150, street light controller 140 returns to step 305 to wait for another mode indication to be received. In response to receiving further mode indications at step 305, street light controller 140 sets (e.g., activates, deactivates, or adjusts), at step 315, the operating mode of street light 150 according to the mode indication received, and the method 300 again returns to step 305. Each further mode indication can indicate to activate PRI mode, deactivate PRI mode, or adjust how PRI mode is being displayed. In some embodiments, reverting to a normal mode is also deactivating PRI mode.

Some embodiments of street light controllers 140 provide that street light controllers 140 can take further actions without receiving a mode indication at step 305. For example, some embodiments provides that an indication to activate PRI mode received at step 305 also specifies a duration for which PRI mode is to be active, such as to indicate a parade lasting two hours, and street light controllers 140 automatically cause PRI mode to be deactivated after the specified duration elapses.

In other embodiments, street light controllers 140 determine independently whether priority vehicle(s) traversing the priority route have passed certain street lights 150 and responsively deactivate the PRI mode for those street lights 150. In some of these embodiments, street light controllers 140 are coupled with audio sensors and execute audio processing applications that detect arrival/departure of audible vehicle-mounted sirens. In some embodiments, street light controllers 140 first sense presence of beacons (e.g., Bluetooth® and/or WiFi® beacons) emanating from a priority vehicle, and then later sense the absence of those beacon(s). In these embodiments, and in other technically feasible embodiments in which street light controllers 140 are capable of detecting the approach and departure of a priority vehicle, street light controllers 140 can independently deactivate the PRI mode of street lights 150, and also can independently update how the street lights 150 illuminate for the PRI mode (such as in the example of causing street lights 150 to blink in response to a priority vehicle approaching those street lights 150, as described with respect to FIG. 2). In these embodiments, a street light controller 140 can also send a message to central controller 130 indicating a current PRI mode of a street light 150 controlled by street light controller 140.

In some embodiments, a single street light controller 140 can control a plurality of street lights 150, and a given indication from central controller 130 can indicate to activate a PRI mode for all or any portion of that plurality of street lights 150. For example, a street light controller 140 could control two or more street lights 150 along a particular street that is on a priority route, and street light controller 140 can control all of these street lights 150 as a group in response to an indication to activate a PRI mode that does not otherwise identify specific street lights 150. Each of street lights 150 can have a unique identifier, and these unique identifiers can be included in the indications. In some embodiments the identifier is unique within a street light system, but in other embodiments the identifier is unique for multiple street light systems, within a particular geography, or even globally unique, such as by being assigned according to a particular convention, similar to MAC address assignments. A street light identifier can be an IPv6 address and/or other network address. Some embodiments use relative identification of street lights 150, for example, a fifth street light controlled by a particular street light controller 140. The indications from central controller 130 can be propagated via messages in a mesh network to and through appropriate street light controllers 140. In such embodiments, street light controllers 140 forward indications within the mesh network so that a single indication can be received at step 305 by multiple street light controllers 140 and these street light controllers 140 then perform step 310 and step 315 according to the contents of that indication.

Figure 4:
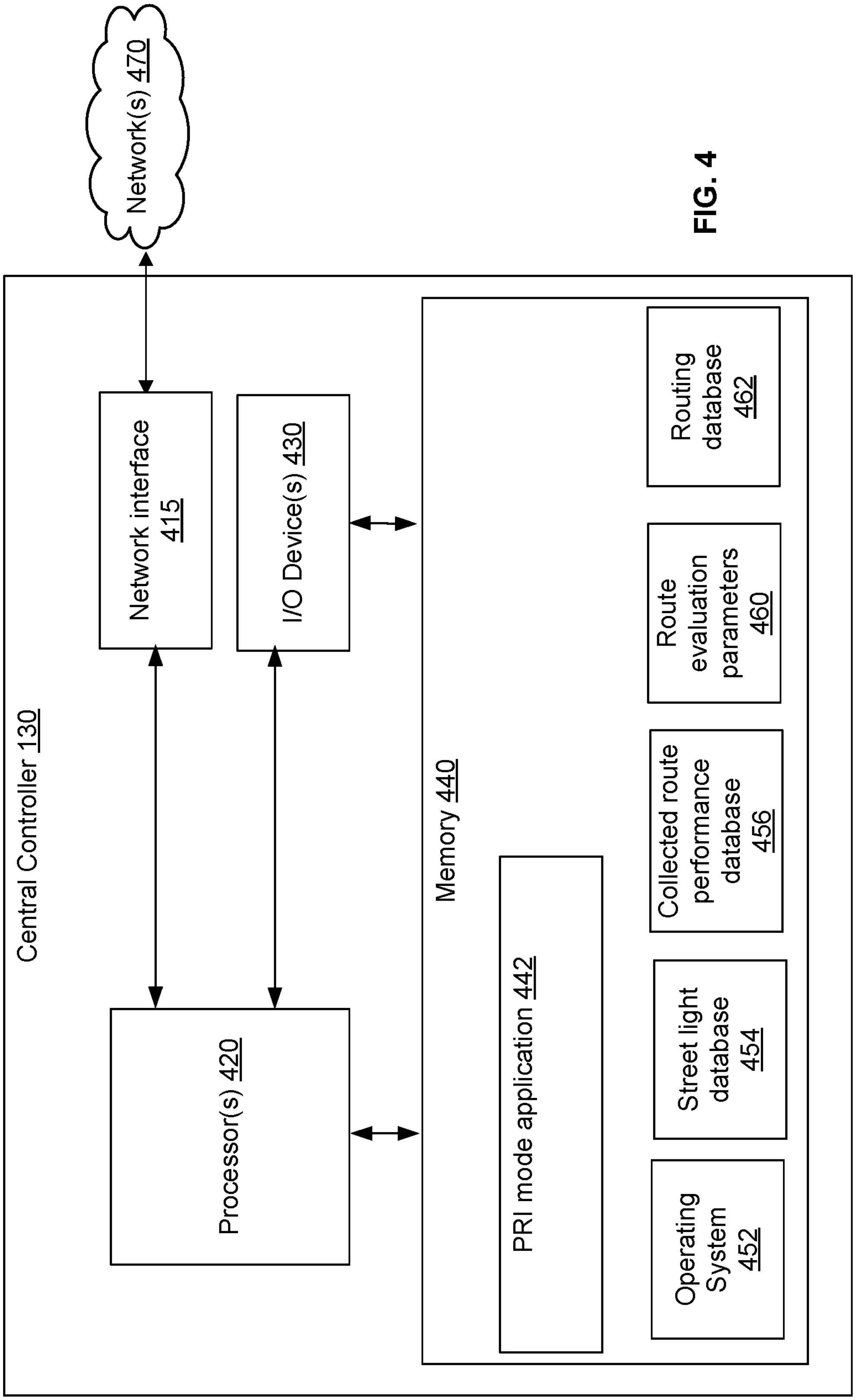
FIG. 4 illustrates an example central controller according to various embodiments.

FIG. 4 illustrates an example central controller 130 according to various embodiments and that can used to implement the techniques discussed above with respect to FIGS. 1-2. Central controller 130 includes, without limitation, one or more processors 420, one or more input/output (I/O) devices 430, network interface 415, and memory 440. One or more processors 420 can include any technically feasible processing device or devices configured to execute program instructions. For example, the one or more processors 420 can include one or more central processing units (CPUs), Digital Signal Processors (DSPs), graphics processing units (GPUs), application-specific integrated circuits (ASICs), field-programmable gate arrays (FPGAs), microprocessors, microcontrollers, other types of processing units, and/or a combination of different processing units. Some embodiments have CPUs that can offload various tasks to FPGAs or DSPs, GPUs or ASICs; these other hardware components can operate as fixed-function or reconfigurable accelerators under control of applications executing instructions in processor(s) 420. These various processor(s) 420 can communicate with each other via shared memory regions in memory 440.

Memory 440 includes one or more units that store data. Memory 440 can be implemented by any combination of technically feasible storage media. For example, memory 440 can include random-access memory (RAM) module(s), solid-state memory unit(s), magnetic storage, and/or other types of memories. In some implementations, memory 440 can be composed of multiple tiers of storage that have different capabilities, such as a bulk storage tier having mass storage capabilities that can be implemented by magnetic and/or solid state storage, a faster bulk storage tier comprising solid-state storage drives, working memories generally comprised of random access memories (such as dynamic random access memory) as well as faster caches that can be composed of static random access memory. Memory management technologies, such as a memory management unit, can be built into processor(s) 420 or otherwise intermediate memory 440 and processor(s) 420 to move data among the tiers of memory 440.

Memory 440 stores, without limitation, a PRI mode application 442, an operating system 452, a street light database 454, a collected route performance database 456, route evaluation parameters 460, and a routing database 462. Operating system 452 executes on one or more processor(s) 420 to provide services to PRI mode application 442. Such services can include interfacing with network interface 415 and with I/O devices 430 through appropriate device drivers, and providing interfaces to access data stored on various partitions in memory 440. Operating system 452 can also provide interfaces for any acceleration functionality that is present in one or more processor(s) 420, such as GPU offload or special-purpose processors.

Street light database 454 stores information for street lights 150, and in some embodiments includes location information and PRI capabilities information. The location information can be one or more of Latitude/Longitude coordinates, a street address, a nearest street intersection, and a name of a road illuminated by that street light 150. PRI capabilities information can include information about which PRI mode(s) each street light 150 supports, including but not limited to an emergency PRI mode, a parade PRI mode, a materials convoy PRI mode, a VIP PRI mode, any combination of the foregoing PRI modes, and other modes where visually (and in some embodiments, visually and audibly) indicating an exception event by street lights is desirable or useful. PRI capabilities information also can include technical capabilities of how each street light 150 illuminates, when in a given PRI mode, such as colors that are supported (e.g., red, green, blue and white), whether the light can adjust intensity of illumination, can blink, blink in pre-defined patterns and so on. The information in street light database 454 can be populated by messages from street light controllers 140 reporting capabilities of street lights 150 that each control, can be populated according to data sheets of street lights 150, or by any other technically feasible approach.

Collected route performance database 456 maintains information about previous priority routes and outcomes of those routes. As described with respect to FIG. 2, central controller 130 receives position updates from one or more vehicles traveling on the priority route. From these position updates, PRI mode application 442 can determine how much time it took a priority vehicle to travel the priority route and segments thereof. PRI mode application 442 can store this information in collected route performance database 456 along with other information, such as a day and a time of day that the priority route was traversed. Some embodiments provide segment-by-segment storage of route data, so that PRI mode application 442 can identify segments that are more or less optimal, to evaluate and/or assemble priority routes in the future.

Route evaluation parameters 460 describe how priority routes are evaluated. In some embodiments, route evaluation parameters 460 can indicate routes or route segments that are considered riskier than others, such as due to the presence of schools and railroad tracks, and should be avoided. Route evaluation parameters 460 can also indicate freeway travel as being more or less desirable. Route evaluation parameters 460 can be established based on particular circumstances within a community.

In some embodiments, routing database 462 maintains information about a network of streets within a geographic area, such as a metropolitan area, served by central controller 130. Routing database 462 also can contain traffic congestion information, which can be updated in real-time and/or based on historical data. In some embodiments, routing database 462 is implemented as a service, and routing database 462 represents accessibility, such as through an API, of routing information and optionally traffic congestion information. In embodiments that implement routing database 462 as a service, PRI mode application 442 can perform translation and/or formatting of data for querying the service and also for responses from the service, so that the response information is useful in querying street light database 454.

PRI mode application 442 includes without limitation program instructions for performing a method according to method 200 of FIG. 2. In some embodiments, PRI mode application 442 receives, via network interface 415, a proposed route from emergency vehicle 120 (or more generally, a priority vehicle as described above). PRI mode application 442 analyzes the proposed route according to step 210, and confirms or proposes another route according to step 215. In order to perform these steps, PRI mode application 442, in some embodiments, accesses routing database 462 to collect information about the proposed route. Such collected information can include a series of Lat/Lon coordinates along the proposed route. Such collected information can include turn-by-turn instructions that specify street names. Some embodiments provide for a combination of these techniques, and/or other technically feasible alternatives. Routing database 462 and street light database 454 can be designed so that information returned from routing database 462 is useful in querying street light database 454 with minimal additional processing by PRI mode application 442. PRI mode application 442 can determine one or more other routes and sends a message via network interface 415 to the priority vehicle that requested the priority route, as described with respect to FIG. 2.

PRI mode application 442 uses responsive proposed route information from routing database 462 as a basis for querying street light database 454 to identify a subset of street lights 150 along the proposed route and street light controllers 140 for that subset of street lights 150. Based on these results, PRI mode application 442 produces indications for receipt by the identified street light controllers 140 of the subset of street lights 150. These indications include information interpretable by street light controllers 140 to activate a PRI mode. Some embodiments support multiple PRI modes, and the indications produced by PRI mode application 442 include information specifying which PRI mode is to be activated; and in the absence of such information, a default PRI mode is activated. If a street light controller 140 controls multiple street lights 150, but only some of the street lights 150 are to have PRI mode activated, then the indication further specifies which of the controlled street lights 150 are to be activated. The indications can be sent to network interface 415 for transmission by network(s) 470 to appropriate street light controllers 140.

As described with respect to FIG. 2, central controller 130 can receive, via network interface 415, position updates from a priority vehicle traversing the priority route. These position updates are used by PRI mode application 442 to determine whether the priority vehicle remains on the priority route. Responsive to determining a deviation from the priority route, PRI mode application 442 queries routing database 462 for an updated route based on a current position of the priority vehicle and operates as described above to evaluate the route. PRI mode application 442 sends an updated priority route to the priority vehicle as described with respect to FIG. 2. Where multiple priority vehicles are traversing the priority route, and one or more of the priority vehicles deviate from the priority route, PRI mode application 442 determines priority routes for each priority vehicle, based on their respective current positions and the destination, using the routing database 462. PRI mode application 442 also uses position updates to determine whether any street lights 150 in the subset that are active in PRI mode have been passed by the priority vehicle, and consequently can be deactivated.

Any updates to or other priority routes determined, as described above, are used as a basis for querying street light database 454 to identify any street lights 150 that are to be added to the subset of street lights 150 to operate in PRI mode. Determinations of passed street lights 150 are used to identify street lights to be removed from the subset of street lights to have PRI mode deactivated. Changes in priority route also can result in additions of street lights 150 to the subset or deletions of street lights from the subset. PRI mode application 442 causes appropriate indications to be sent to street light controllers 140 of any street lights 150 that were removed from the subset and street light controllers 140 for any street lights 150 that were added to the subset. PRI mode application 442 operates in this fashion until the priority vehicle(s) reach a destination of the priority route.

Some embodiments of central controller 130 include multiple distinct computing systems, each of which can include any of the elements depicted in FIG. 4. In some embodiments, parts of PRI mode application 442 are executed across a distributed set of computing systems that are coupled to a network for receiving and outputting data that will vary based on what part of PRI mode application 442 a particular computing system is performing. PRI mode application 442 can be deployed to a cloud-based environment, such as into a Platform As a Service (PAAS) infrastructure, for execution.

Any of the databases depicted in FIG. 4 can be implemented using a managed data storage infrastructure that includes a storage management layer and a variety of storage elements, such as storage local to a specific computing system, network attached storage, on-premises cloud storage, off-premises cloud storage and combinations thereof. Therefore, data used by PRI mode application 442 can be obtained from any of these storage elements through the storage management layer and PRI mode application 442 does not need to directly interface with data storage.

I/O device(s) 430 can include serial bus interfaces (e.g., PCIe and CXI) that run over electrical or optical physical media. I/O device(s) 430 provide one interface by which central controller 130 can obtain data located on bulk storage. If central controller 130 is implemented as a distributed system, such that parts of PRI mode application 442 execute on different computing systems, and/or that parts of the method of FIG. 2 executes on different computing systems, I/O device(s) 430 can support the exchange of data between or among those computing systems. For example, one computing system can be responsible for sending indications to network interface 415 to be sent to street light controllers 140, and I/O devices 430 can be used by other computing systems to send data representative of indications to that computing system. I/O devices packetize or otherwise format and transmit such data as appropriate for a particular interface on which such data is sent. I/O devices 430 also can be configured to interface with one or more Human Interface Devices (HID), such as a keyboard, monitor and mouse, which allows management of central controller 130, as well as status information to be obtained from central controller 130.

Network interface 415 couples one or more processors 420 with a network 470. Network interface 415 can be implemented as one or more of a wired, wireless, and optical interface. In some embodiments, network interface 415 is an Ethernet interface, such as a gigabit or ten gigabit Ethernet interface, which can use wired or optical physical media. In some embodiments, network interface 415 is a WiFi® compliant wireless network interface. In some embodiments, network interface 415 includes a cellular modem that communicates with wireless cellular infrastructure. In some embodiments, central controller 130 includes a variety of other supporting hardware, including power management hardware, secure boot hardware, a real-time clock (RTC), and other functionality as is technically feasible or useful for central controller 130.

Figure 5:
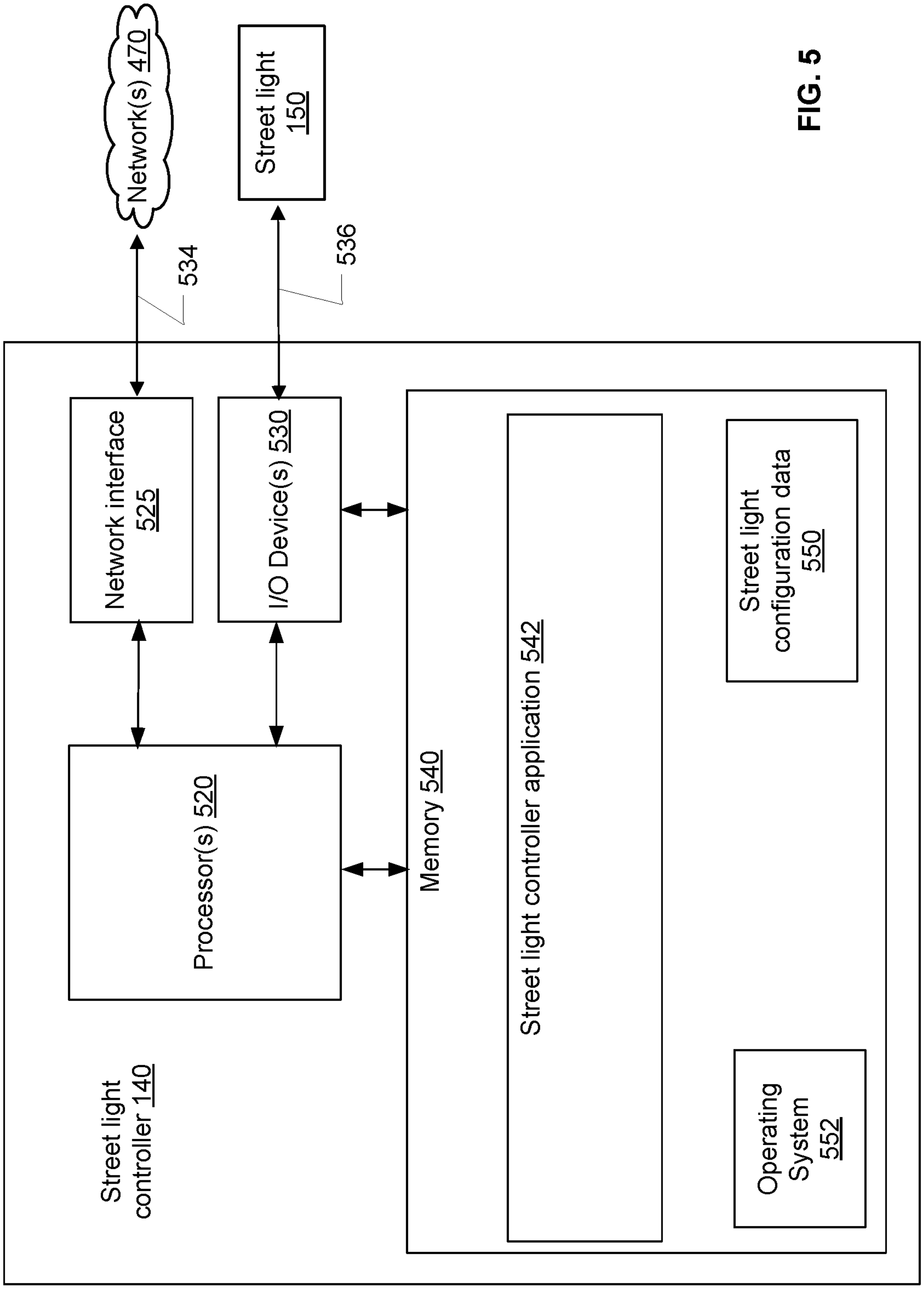
FIG. 5 illustrates an example street light controller according to various embodiments.

FIG. 5 illustrates an example street light controller 140 according to various embodiments, that is used to implement the techniques discussed above with respect to FIGS. 1 and 3. Street light controller 140 includes, without limitation, one or more processors 520, one or more input/output (I/O) devices 530, network interface 525, and memory 540. One or more processors 520 can include any technically feasible processing device or devices configured to process data and execute program instructions. For example, the one or more processors 420 can include one or more central processing units (CPUs), Digital Signal Processors (DSPs), graphics processing units (GPUs), application-specific integrated circuits (ASICs), field-programmable gate arrays (FPGAs), microprocessors, microcontrollers, other types of processing units, and/or a combination of different processing units. Some embodiments provide that CPUs can offload various tasks to FPGAs or DSPs, GPUs or ASICs; these other hardware components can operate as fixed-function or reconfigurable accelerators under control of applications executing instructions in processor(s) 520. These various processor(s) 520 can communicate with each other via shared memory spaces in memory 540.

Memory 540 includes one or more units that store data. Memory 540 can be implemented by any combination of technically feasible storage media. For example, memory 540 can include random-access memory (RAM) module(s), solid-state memory unit(s), magnetic storage, and/or other types of memories. In some implementations, memory 540 can be composed of multiple tiers of storage that have different capabilities, such as a bulk storage tier having mass storage capabilities that can be implemented by magnetic and/or solid state storage, a faster bulk storage tier comprising solid-state storage drives, working memories generally comprised of random access memories (such as dynamic random access memory) as well as faster caches that can be composed of static random access memory. Memory management technologies, such as a memory management unit, can be built into processor(s) 520 or otherwise intermediate memory 540 and processor(s) 520 to move data among the tiers of memory 540.

Memory 540 stores, without limitation, in some embodiments, a street light controller application 542, an operating system 552 and a street light configuration data 550. Operating system executes on one or more processor(s) 520 to provide services to street light controller application 542. Such services can include interfacing with network interface 525 and with I/O devices 530 through appropriate device drivers, and providing interfaces to access data stored on various partitions in memory 540. Operating system 552 also can provide interfaces for any acceleration functionality that is present in one or more processor(s) 520, such as GPU offload or special-purpose processors.

Street light controller application 542 processes mode indications for street lights 150 that are received by street light controller 140. As discussed above with respect to FIGS. 2 and 3, an indication sent by central controller 130 to street light controller 140 directs street light controller 140 to activate, deactivate, or adjust PRI mode at one or more street lights 150. The indication will contain information that varies dependent on the embodiment and street light controller application 542 processes these indications accordingly. In one example, street light controller 140 controls a single street light 150, and that street light supports a single PRI mode without any capability to adjust that PRI mode; in such example, street light controller application 542 parses the indication to determine whether PRI mode is to be activated or deactivated and optionally a time at which that action is to be taken. In embodiments where street light controller 140 controls multiple street lights 150, street light controller 140 further parses the indication to identify for which of these street lights 150 PRI mode is to be activated, deactivated or adjusted according to the various details above. Street light controller application 542 can access street light configuration data 550 to determine how to interface with a particular street light 150. Street light controller application 542 can include program instructions to implement any of the various embodiments, options and implementations described above with respect FIGS. 1 and 3, and otherwise to interface and support indications sent to street light controller 140 by central controller 130 according to FIGS. 1 and 2. Street light controller application 542 communicates through one or more of network interface 525 and I/O devices 530 with street light 150 in order to effectuate the indication received, depending on configuration and capabilities of street light 150 and street light controller 140.

Network interface 525 couples one or more processors 420 with a network 470. Network interface 525 can be implemented as one or more of a wired, wireless, and optical network interface. In some embodiments, network interface 525 is an Ethernet interface, such as a gigabit or ten gigabit Ethernet interface, which can use wired or optical physical media 534. In some embodiments, network interface 525 is a WiFi-compliant wireless network interface. In some embodiments, network interface 525 is a cellular network interface. Some embodiments include combinations of any of the above network interfaces. Street light controller 140 can receive program updates via network interface 525 from central controller 130. In some embodiments, street light controller 140 can interface with street lights 150 via network interface 525, where those street lights 150 include a wireless or wired network interface. In some such embodiments, street lights 150 can interface with a wired network interface 525 that implements an industrial communication protocol, such as Fieldbus, EtherCAT® or Modbus TCP. In other such embodiments, street lights 150 include a cellular modem that interfaces with a corresponding cellular interface at street light controller 140.

I/O device(s) 430 can include serial bus interfaces, such as interfaces that implement RS-422, CAN bus, or PCIe standard interfaces, that run over electrical and/or optical physical media 536 and that connect with one or more street lights 150. I/O device(s) 530 support signaling and/or transmission of data from street light controller 140 to street light 150, and some embodiments provide that street light 150 can send data to street light controller 140. In some embodiments, I/O devices 430 are used by street light controller 140 to cause street light 150 to activate, deactivate or adjust a PRI mode. In some embodiments, street light controller 140 writes data to a PRI mode status register in street light 150, and in other embodiments, sends a data packet with an indication, in each case for causing activation, deactivation or adjustment of a PRI mode. In some embodiments, street light 150 polls a status register located in I/O devices 530 for PRI mode status information and then implements any PRI mode status as indicated by that status register. In other embodiments, I/O devices 530 include a driver circuit, such as a voltage or current mode driver circuit, which powers circuitry in street light 150 that causes street light 150 to illuminate according to a received PRI mode indication. I/O devices packetize or otherwise format and transmit such data as appropriate for a particular interface on which such data is sent. I/O device(s) 530 also provide one interface by which street light controller 140 can obtain data located on external storage media. In some embodiments, a street light controller 140 supports a selection of one or more approaches to interfacing with street light(s) 150, including from among the example approaches disclosed herein. Some embodiments provide multiple interfaces between street light controller 140, where one such interface is a primary interface, and one or more others interfaces are used as backup interfaces to provide fault tolerance.

I/O devices 430 also can be configured to interface with one or more Human Interface Devices (HID), such as a keyboard, monitor and mouse, which allows local management of street light controller 140, as well as status information to be obtained from street light controller 140. Some embodiments of I/O devices 430 interface with one or more audio sensors designed to sense audible signals, such as sirens, from priority vehicles. In some embodiments, street light controller application 542 processes data for these audible signals to determine approaching and departing priority vehicles and control deactivation of a PRI mode after passing of the priority vehicles, as explained with respect to FIG. 3.

As would be understood from these disclosures, street light controller 140 can be implemented using a wide variety of technologies. In some embodiments, the technologies implementing street light controller 140 are selected based on technologies present in or otherwise coordinated with design of street lights 150. Most particularly, I/O devices 530 are provided that can interface with street lights 150, and street light controller application 542 includes program instructions that use I/O devices 530 according to how street lights 150 are controlled. In some embodiments, street light controller 140 is implemented without a fully programmable processor 520, and instead includes a state machine that is implemented in fixed function circuitry, and/or an FPGA, and any other technically feasible approach. In some embodiments, street light controller 140 includes a variety of other supporting hardware, including power management hardware, secure boot hardware, a real-time clock (RTC), and other functionality as is technically feasible or useful for street light controller 140.

Figure 6:
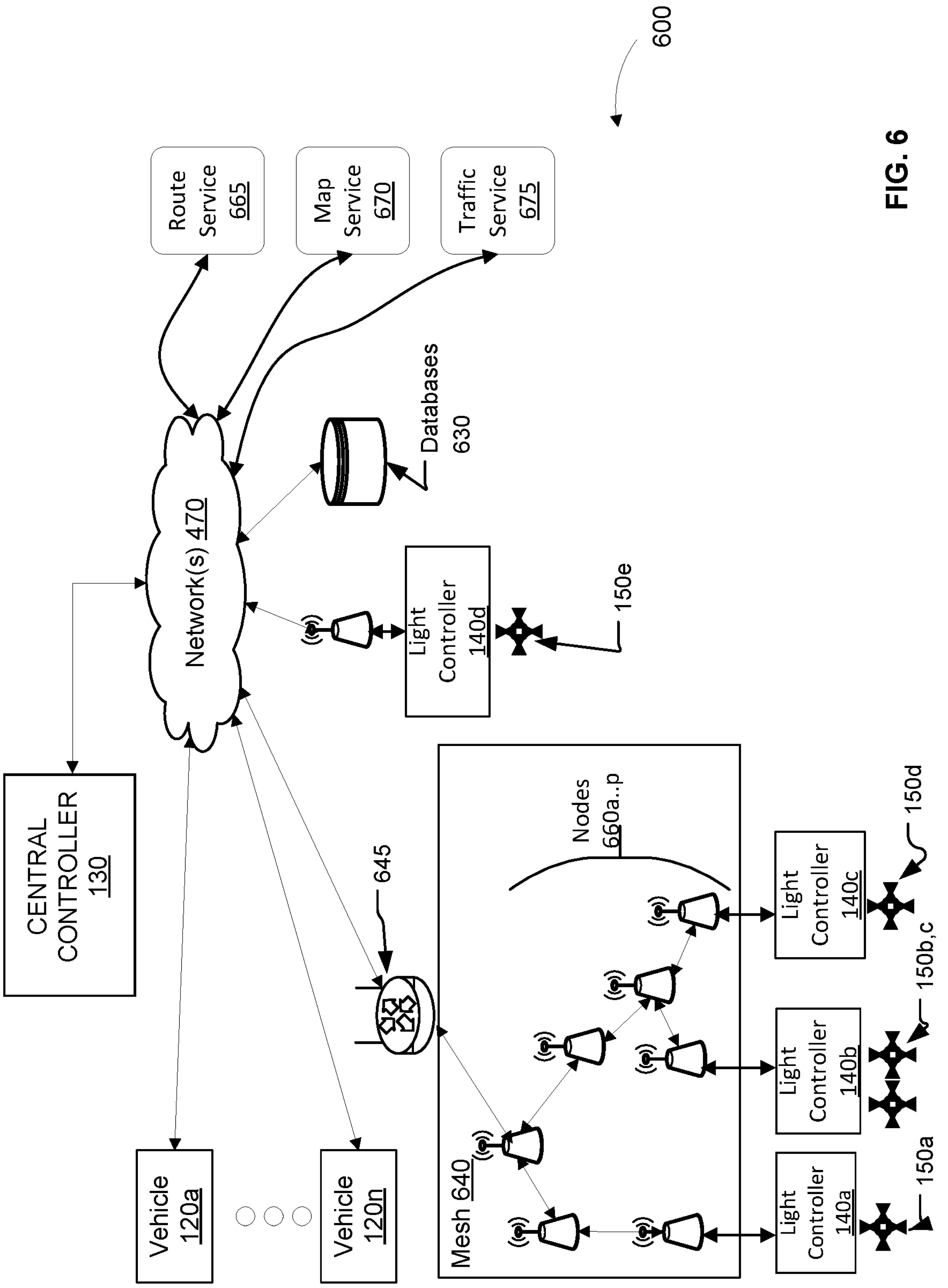
FIG. 6 illustrates an example network system according to various embodiments.

FIG. 6 illustrates an example network system 600 that can be used to implement one or more aspects of the various embodiments. System 600 includes, without limitation, central controller 130, street light controllers 140*a-d*, databases 630, mesh network 640, mesh gateway 645, route service 665, map service 670, and traffic service 675.

Example embodiments of central controller 130 and street light controllers 140*a-d* and operation thereof are described above. Databases 630 represent any technically feasible implementation of data storage and associated interface(s) that provides a capability to search for and retrieve data. In some embodiments, databases 630 store data used by central controller 130, including, for example, any part of or all of any of the street light database 454, routing database 462, and collected route performance database 456, which are used in accordance with FIGS. 1 and 3 and associated description. In some embodiments, databases 630 are cloud-hosted.

Mesh network 640 interfaces with network 470 via mesh gateway 645. Mesh network includes, without limitation, intermediate nodes 660*a-p* that are communicatively coupled to allow street light controllers 140*a . . . c* to communicate through mesh gateway 645 and network 470 with central controller 130. In this example, street light 150*a* is controlled by street light controller 140*a*, street lights 150*b* and 150*c* are controlled by street light controller 140*b*, and street light 150*d* is controlled by street light controller 140*c*. Street light controller 140*d*, which controls street light 150*e*, communicates through a wireless interface with network 470, rather than using mesh network 640. Street light controller 140*d* can have a TCP/IP stack that permits Internet Protocol (IP) addressing and routing between central controller 130 and street light controller 140*d*.

Route service 665, map service 670 and traffic service 675 represent network-accessible services that can be queried by central controller 130 to obtain information used in route planning, map retrieval and obtaining traffic information, in addition to or in substitution of data and services local to central controller 130, as discussed with respect to FIG. 4. Any of these services can be provided by or through third-party proprietary interfaces and/or publicly available services and datasets.

Vehicles 120*a* . . . 120*n* represent priority vehicles that can send priority route indications, make priority route requests, send updates while on a priority route, and other actions ascribed to priority vehicles herein. As described with respect to FIGS. 1 and 2, multiple of these vehicles 120*a-n* can be traveling on one or more priority routes at a given time. Vehicles 120*a* . . . 120*n* couple with network 470 to communicate with central controller 130 using one or more wireless communications technologies, such as WiFi and/or cellular communications.

In some embodiments, central controller 130 is implemented as a distributed system, including within a cloud environment, such that functionality attributed to central controller 130 can be implemented by virtual machines hosted on a server farm, cloud platforms, and so forth. In these embodiments, network interface 415 can be software-defined and physically shared with other applications or functionality, and data used in the methods of FIGS. 1 and 2 can hosted on hardware that is shared with other databases. As such, it would be understood from these disclosures that central controller 130 can be implemented using a wide variety of technologies, ranging from fully dedicated hardware and/or software resources to a fully hosted software service running on a platform hosted by a third party, and any other technically feasible approach.

At least one technical advantage of the disclosed techniques relative to the prior art is that, with the disclosed techniques, a priority route within a network of streets can be clearly visually indicated. Clear visual indications of such priority routes reduce emergency vehicle response times and allow other drivers in the network of streets to operate their vehicles in a safer manner. Additional technical advantages include that the priority route can be centrally controlled, and adaptive to any of a variety of inputs, including real-time traffic inputs and route changes by emergency response vehicles. An additional technical advantage of the disclosed techniques is that priority routes taken by emergency vehicles can be systematically analyzed and recommendations for the best route for any given emergency (or other reason for a priority route indication) can be provided based on this systematic analysis so that emergency routes can be optimized and also adjusted as traffic patterns change such as due to new developments, seasonal differences, and so forth.

1. A method comprising: receiving, by a central controller, a request to indicate a priority route in a network of streets to be used by one or more vehicles; querying, by the central controller, a database of street lights to select a plurality of street lights that are located along the priority route; and transmitting, by the central controller, to respective street light controllers associated with the selected plurality of street lights, respective indications to operate the selected plurality of street lights in a priority route mode.

2. The method of clause 1, further comprising determining, by the central controller, respective start times at which the street lights are to commence operating in the priority route mode, and wherein the respective indications further indicate the respective start times for the selected plurality of street lights.

3. The method of clauses 1 or 2, further comprising determining, by the central controller, respective stop times at which the street lights are to stop operating in the priority route mode, and wherein the respective indications further indicate the respective stop times.

4. The method of any of clauses 1-3, further comprising receiving, by the central controller, in connection with the request for the priority route, an indication of a requested duration for the priority route mode and transmitting, at one or more times selected based on the requested duration, one or more additional respective indications to the respective street light controllers to stop operating at least some portion of the selected plurality of street lights in the priority route mode.

5. The method of any of clauses 1-4, further comprising: receiving, by the central controller, updates containing position information for the one or more vehicles; determining, by the central controller, whether the one or more vehicles are on the priority route, based on the position information; in response to determining that the one or more vehicles are not on the priority route, generating, by the central controller, a proposed alternative priority route that leads to a destination of the priority route; and transmitting, by the central controller, the proposed alternative priority route for use by the one or more vehicles.

6. The method of any of clauses 1-5, further comprising: receiving, by the central controller, updates containing position information for the one or more vehicles; determining, by the central controller, whether the one or more vehicles have passed one or more street lights on the priority route that are operating in the priority route mode; and transmitting, by the central controller to the respective street light controllers for street lights that were determined to have been passed by the one or more vehicles, respective indications to stop operating those street lights in the priority route mode.

7. The method of any of clauses 1-6, wherein: the request to indicate the priority route comprises information identifying a leading vehicle and a trailing vehicle; and the method further comprises transmitting, by the central controller, to respective street light controllers for street lights that were determined to have been passed by both the leading vehicle and the trailing vehicle, indications to stop operating those street lights in the priority route mode.

8. The method of any of clauses 1-7, wherein the priority route mode is selected from a plurality of priority route modes based on a type of the priority route.

9. The method of any of clauses 1-8, further comprising: determining, by the central controller, that the one or more vehicles are approaching one or more street lights on the priority route; and responsively transmitting, by the central controller to respective street light controllers for street lights approached by the one or more vehicles, respective indications to update operation of the priority route mode.

10. The method of any of clauses 1-9, wherein the request identifies a destination for the priority route, the method further comprising determining, by the central controller, the priority route; sending, by the central controller, the priority route to the one or more vehicles; and receiving, by the central controller, respective confirmations of the priority route from the one or more vehicles.

11. One or more non-transitory computer-readable media storing instructions which, when executed by one or more processors at a central controller for controlling a plurality of street light controllers, cause the one or more processors to perform operations comprising: receiving information defining a priority route in a network of streets to be used by one or more vehicles; selecting street lights, from a plurality of street lights, that are located along the priority route; and transmitting, to respective street light controllers associated with the selected street lights, respective first messages to control the selected street lights to operate in a priority route mode.

12. The one or more non-transitory computer-readable media of clause 11, wherein the operations further comprise including, in the respective first messages, respective times at which the selected street lights are to operate in the priority mode.

13. The one or more non-transitory computer-readable media of clauses 11 or 12, wherein the operations further comprise including, in the respective first messages, respective times at which the selected street lights are to stop operating in the priority route mode.

14. The one or more non-transitory computer-readable media of any of clauses 11-13, wherein the operations further comprise: receiving respective position updates for the one or more vehicles; determining that one or more of the selected street lights have been passed by the one or more vehicles; and transmitting, to the respective street light controllers associated with the selected street lights that have been passed by the one or more vehicles, respective second messages to control the selected street lights that have been passed by the one or more vehicles to stop operating in the priority route mode.

15. The one or more non-transitory computer-readable media of any of clauses 11-14, wherein the operations further comprise including, in the respective first messages, an indication of a priority route mode type to be activated, from among a plurality of priority route mode types.

16. A street light controller comprising: one or more processors; and a memory storing executable instructions that, when executed by the one or more processors, cause the one or more processors to perform operations comprising: receiving an indication from a central controller to operate a street light coupled with the street light controller in a priority route mode; in response to receiving the indication, causing the street light to operate in the priority route mode, wherein the priority route mode causes the street light to be visually distinct from street lights operating in a normal mode; and maintaining the street light in the priority route mode until a further indication to deactivate the priority route mode is received.

17. The street light controller of clause 16, wherein: the street light is capable of operating in at least two priority route modes; and the indication, received by the one or more processors, specifies in which of the priority route modes the street light is to operate.

18. The street light controller of clauses 16 or 17, wherein the operations further comprise receiving a second indication from the central controller, and in response to receiving the second indication, causing the street light to cease operating in the priority route mode.

19. The street light controller of any of clauses 16-18, wherein: the indication, received by the one or more processors, further includes timing information for when the street light is to operate in the priority route mode; and the operations further comprise further causing the street light to operate in the priority route mode according to the timing information.

20. The street light controller of any of clauses 16-19, wherein: a second street light is capable of operating in an illumination mode and the priority route mode; and the operations further comprise causing the second street light to operate in the illumination mode while the street light operates in the priority route mode.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure can take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:

receiving, by a central controller, a request to indicate a priority route in a network of streets to be used by one or more vehicles;

querying, by the central controller, a database of street lights to select a plurality of street lights that are located along the priority route, wherein respective street lights of the selected plurality of street lights are capable of operating in an illumination mode and a priority route mode, where the respective street lights illuminate surroundings around the respective street lights while in the illumination mode and the respective street lights provide a priority route indication while in the priority route mode; and transmitting, by the central controller, to respective street light controllers associated with the selected plurality of street lights, respective indications to operate the selected plurality of street lights in the priority route mode.

2. The method of claim 1, further comprising determining, by the central controller, respective start times at which the street lights are to commence operating in the priority route mode, and wherein the respective indications further indicate the respective start times for the selected plurality of street lights.

3. The method of claim 1, further comprising determining, by the central controller, respective stop times at which the street lights are to stop operating in the priority route mode, and wherein the respective indications further indicate the respective stop times.

4. The method of claim 1, further comprising receiving, by the central controller, in connection with the request for the priority route, an indication of a requested duration for the priority route mode and transmitting, at one or more times selected based on the requested duration, one or more additional respective indications to the respective street light controllers to stop operating at least some portion of the selected plurality of street lights in the priority route mode.

5. The method of claim 1, further comprising:

receiving, by the central controller, updates containing position information for the one or more vehicles;

determining, by the central controller, whether the one or more vehicles are on the priority route, based on the position information;

in response to determining that the one or more vehicles are not on the priority route, generating, by the central controller, a proposed alternative priority route that leads to a destination of the priority route; and transmitting, by the central controller, the proposed alternative priority route for use by the one or more vehicles.

6. The method of claim 1, further comprising:

receiving, by the central controller, updates containing position information for the one or more vehicles;

determining, by the central controller, whether the one or more vehicles have passed one or more street lights on the priority route that are operating in the priority route mode; and transmitting, by the central controller to the respective street light controllers for street lights that were determined to have been passed by the one or more vehicles, respective indications to stop operating those street lights in the priority route mode.

7. The method of claim 1, wherein:

the request to indicate the priority route comprises information identifying a leading vehicle and a trailing vehicle; and the method further comprises transmitting, by the central controller, to respective street light controllers for street lights that were determined to have been passed by both the leading vehicle and the trailing vehicle, indications to stop operating those street lights in the priority route mode.

8. The method of claim 1, wherein the priority route mode is selected from a plurality of priority route modes based on a type of the priority route.

9. The method of claim 1, further comprising:

determining, by the central controller, that the one or more vehicles are approaching one or more street lights on the priority route; and responsively transmitting, by the central controller to respective street light controllers for street lights approached by the one or more vehicles, respective indications to update operation of the priority route mode.

10. The method of claim 1, wherein the request identifies a destination for the priority route, the method further comprising:

determining, by the central controller, the priority route;

sending, by the central controller, the priority route to the one or more vehicles; and receiving, by the central controller, respective confirmations of the priority route from the one or more vehicles.

11. One or more non-transitory computer-readable media storing instructions which, when executed by one or more processors at a central controller for controlling a plurality of street light controllers, cause the one or more processors to perform operations comprising:

receiving information defining a priority route in a network of streets to be used by one or more vehicles;

selecting street lights, from a plurality of street lights, that are located along the priority route, wherein respective street lights of the selected plurality of street lights are capable of operating in an illumination mode and a priority route mode, where the respective street lights illuminate surroundings around the respective street lights while in the illumination mode and the respective street lights provide a priority route indication while in the priority route mode; and transmitting, to respective street light controllers associated with the selected street lights, respective first messages to control the selected street lights to operate in the priority route mode.

12. The one or more non-transitory computer-readable media of claim 11, wherein the operations further comprise including, in the respective first messages, respective times at which the selected street lights are to operate in the priority route mode.

13. The one or more non-transitory computer-readable media of claim 11, wherein the operations further comprise including, in the respective first messages, respective times at which the selected street lights are to stop operating in the priority route mode.

14. The one or more non-transitory computer-readable media of claim 11, wherein the operations further comprise:

receiving respective position updates for the one or more vehicles;

determining that one or more of the selected street lights have been passed by the one or more vehicles; and transmitting, to the respective street light controllers associated with the selected street lights that have been passed by the one or more vehicles, respective second messages to control the selected street lights that have been passed by the one or more vehicles to stop operating in the priority route mode.

15. The one or more non-transitory computer-readable media of claim 11, wherein the operations further comprise including, in the respective first messages, an indication of a priority route mode type to be activated, from among a plurality of priority route mode types.

16. A street light controller comprising:

one or more processors; and a memory storing executable instructions that, when executed by the one or more processors, cause the one or more processors to perform operations comprising:

receiving an indication from a central controller to operate a street light coupled with the street light controller in a priority route mode, wherein the street light is capable of operating in an illumination mode and a priority route mode, where the street light illuminates surroundings around the street light while in the illumination mode and the street light provides a priority route indication while in the priority route mode;

in response to receiving the indication, causing the street light to operate in the priority route mode, wherein the priority route mode causes the street light to be visually distinct from street lights operating in the illumination mode; and maintaining the street light in the priority route mode until a further indication to deactivate the priority route mode is received.

17. The street light controller of claim 16, wherein:

the street light is capable of operating in at least two priority route modes; and the indication, received by the one or more processors, specifies in which of the priority route modes the street light is to operate.

18. The street light controller of claim 16, wherein the operations further comprise receiving a second indication from the central controller, and in response to receiving the second indication, causing the street light to cease operating in the priority route mode.

19. The street light controller of claim 16, wherein:

the indication, received by the one or more processors, further includes timing information for when the street light is to operate in the priority route mode; and the operations further comprise further causing the street light to operate in the priority route mode according to the timing information.

20. The street light controller of claim 16, wherein:

the operations further comprise causing a second street light to operate in the illumination mode while the street light operates in the priority route mode.

* * * * *